(12) United States Patent
Brockway et al.

(10) Patent No.: US 11,041,665 B1
(45) Date of Patent: Jun. 22, 2021

(54) DROPLET-FIELD HEAT TRANSFER SURFACES AND SYSTEMS THEREOF

(71) Applicant: Nelumbo Inc., Hayward, CA (US)

(72) Inventors: Lance R. Brockway, Berkeley, CA (US); David C. Walther, Los Altos, CA (US)

(73) Assignee: Nelumbo Inc., Hayward, CA (US)

( * ) Notice: Subject to any disclaimer, the term of this patent is extended or adjusted under 35 U.S.C. 154(b) by 94 days.

(21) Appl. No.: 16/201,150

(22) Filed: Nov. 27, 2018

Related U.S. Application Data

(60) Provisional application No. 62/592,515, filed on Nov. 30, 2017.

(51) Int. Cl.
| | |
|---|---|
| *F25B 40/02* | (2006.01) |
| *F25B 39/00* | (2006.01) |
| *F25B 1/00* | (2006.01) |
| *F28D 7/16* | (2006.01) |
| *F28D 21/00* | (2006.01) |

(52) U.S. Cl.
CPC ............... *F25B 40/02* (2013.01); *F25B 1/00* (2013.01); *F25B 39/00* (2013.01); *F28D 7/1607* (2013.01); *F25B 2400/05* (2013.01); *F28D 2021/0068* (2013.01); *F28F 2215/00* (2013.01)

(58) Field of Classification Search
CPC .. F25B 40/02; F25B 1/00; F25B 39/00; F25B 2400/02; F28F 2245/04; F28F 13/187; F28F 2215/00; F28D 7/1607; F28D 2021/0068
See application file for complete search history.

(56) References Cited

U.S. PATENT DOCUMENTS

| | | | |
|---|---|---|---|
| 6,158,230 | A | 12/2000 | Katsuki |
| 6,427,454 | B1 | 8/2002 | West |
| 8,540,889 | B1 | 9/2013 | Hartlove et al. |
| 9,147,633 | B2 | 9/2015 | Eid et al. |
| 9,362,201 | B2 | 6/2016 | Gavillet et al. |
| 2004/0055892 | A1 | 3/2004 | Oh et al. |
| 2004/0118698 | A1 | 6/2004 | Lu et al. |
| 2006/0141268 | A1 | 6/2006 | Kalkan et al. |
| 2010/0099012 | A1 | 4/2010 | Adzic |

(Continued)

FOREIGN PATENT DOCUMENTS

| | | |
|---|---|---|
| CN | 201575646 U | 9/2010 |
| CN | 102748987 A | 10/2012 |

(Continued)

OTHER PUBLICATIONS

Aili, A., et al., Characteristics of Jumping Droplet-Enhanced Condensation on Nanostructured Micromesh Surface, 2016, ASME 2016 5th International Conference on Micro/Nanoscale Heat and Mass Transfer, V001T004A001.

(Continued)

*Primary Examiner* — Joseph F Trpisovsky
(74) *Attorney, Agent, or Firm* — FisherBroyles, LLP; Jill A. Jacobson

(57) ABSTRACT

Methods and systems are provided for heat transfer from a process fluid, such as humid air, to liquid droplets that are generated by contact of a heat transfer surface with the process fluid. The heat transfer surface rapidly ejects liquid droplets, which may then be coalesced and removed, thereby cooling the process fluid. Enhanced methods of condensate collection are described.

19 Claims, 6 Drawing Sheets

(56) References Cited

U.S. PATENT DOCUMENTS

| | | |
|---|---|---|
| 2010/0203287 A1 | 8/2010 | Jiang et al. |
| 2011/0198059 A1 | 8/2011 | Gavillet et al. |
| 2011/0253007 A1 | 10/2011 | Zastrau et al. |
| 2012/0231290 A1 | 9/2012 | Ho et al. |
| 2013/0244001 A1 | 9/2013 | Wang et al. |
| 2013/0330501 A1 | 12/2013 | Aizenberg |
| 2014/0011013 A1 | 1/2014 | Jin et al. |
| 2014/0017456 A1 | 1/2014 | Xiao et al. |
| 2014/0182790 A1 | 7/2014 | Hwang et al. |
| 2014/0208978 A1 | 7/2014 | Sunder et al. |
| 2014/0231052 A1 | 8/2014 | Takasawa et al. |
| 2014/0238646 A1 | 8/2014 | Enright |
| 2014/0247556 A1 | 9/2014 | Eid |
| 2016/0068703 A1 | 3/2016 | Schmidt et al. |
| 2016/0097606 A1 | 4/2016 | Xiao et al. |
| 2016/0107121 A1* | 4/2016 | Lienhard ............ B01D 69/02 210/640 |
| 2017/0282416 A1 | 10/2017 | Kim et al. |
| 2020/0088432 A1* | 3/2020 | Nagano ............... F28D 1/047 |

FOREIGN PATENT DOCUMENTS

| | | |
|---|---|---|
| CN | 103173832 A | 6/2013 |
| CN | 104451814 A | 3/2015 |
| EP | 2752504 B1 | 4/2016 |
| WO | 2014/012052 A1 | 1/2014 |
| WO | 2017/031391 A1 | 2/2017 |
| WO | 2018/053452 A1 | 3/2018 |
| WO | 2018/053453 A1 | 3/2018 |
| WO | 2018/132519 A1 | 7/2018 |
| WO | 2019/183503 A2 | 9/2019 |

OTHER PUBLICATIONS

Kang, S.M., et al., Directional Oil Sliding Surfaces with Hierarchical Anisotropic Groove Microstructures, Aug. 5, 2013, Adv. Mater. 25(40):5756-5671.

Lv, Y., et al., Fabrication of Superhydrophobic Films on Aluminum Foils with Controllable Morphologies, Jan. 11, 2013, Adv. Mat. Res. 641-642:414-417.

Miljkovic, N., et al., Jumping-Droplet-Enhanced Condensation on Scalable Superhydrophobic Nanostructured Surfaces, 2013, Nano Lett., 13(1):179-187.

Miljkovic, N., et al., Modeling and Optimization of Superhydrophobic Condensation, 2013, J. Heat Transf.-Trans., ASME 135:14.

Miljkovic, N., et al., Condensation heat transfer on superhydrophobic surfaces, 2013, MRS Bull. 38:397-406.

Mozalev, A., et al., The superhydrophobic properties of self-organized microstructured surfaces derived from anodically oxidized Al/Nb and Al/Ta metal layers, 2012, Electrochimica Acta 82:90-97.

Tuteja, A., et al., Design Parameters for Superhydrophobicity and Superoleophobicity, Jan. 1, 2011, MRS Bulletin 33(8):752-758.

Wang, Z., et al., In situ growth of hierarchical boehmite on 2024 aluminum alloy surface as superhydrophobic materials, 2014, RSC Adv. 4:14708-14714.

Zhao J. et al. CoMn-layered double hydroxide nanowalls supported on carbon fibers for high-performance flexible energy storage devices, 2013, J. Mater. Chem. A, 1:8836-8843.

\* cited by examiner

DROPLET-FIELD HEAT TRANSFER SURFACES AND SYSTEMS THEREOF

CROSS-REFERENCE TO RELATED APPLICATIONS

This application claims the benefit of U.S. Provisional Application No. 62/592,515, filed on Nov. 30, 2017, which is incorporated by reference herein in its entirety.

FIELD OF THE INVENTION

The invention generally relates to the cooling of a process fluid by transferring heat into an entrained field of microdroplets in addition to the working fluid. A heat exchanger-coalescer is also described.

BACKGROUND

In typical cooling systems, heat is transferred to or from a process fluid or to or from a working fluid. The amount of energy transferred to or from the process fluid is the same as the amount of energy transferred from or to the working fluid, respectively, and energy is thus conserved. A specific example of such a heat transfer system is an air conditioner, in which the process fluid is humid air and the working fluid is a refrigerant. The amount of energy transferred from the air, due to reducing the temperature of and dehumidifying the air, is equal to the amount of energy used to evaporate and heat the refrigerant. It would be advantageous to decouple the process fluid and working fluid heat transfer processes, because a lesser amount of working fluid could be used to achieve a similar degree of energy transfer to the process fluid, thus increasing the heat transfer efficiency.

BRIEF SUMMARY OF THE INVENTION

Heat transfer surfaces are described herein that serve to decouple the heat transfer from a process fluid (e.g., humid air in the case of an air conditioner) into a working fluid (e.g., refrigerant in the case of an air conditioner, or chilled water or other coolant systems that do not rely on phase change within a heat exchanger). For example, the heat transfer surface may include a droplet ejecting coating that causes microdroplets and/or nanodroplets to rapidly leave the surface.

Heat transfer systems are provided herein that decouple the heat transfer from a process fluid into a working fluid. The systems described herein include use of condensate generated by the heat removal from the process fluid as an additional heat sink. For example, a heat transfer surface as described herein may be used to produce a condensate from the process fluid. Heat from the process fluid is captured in the condensate. This essentially uses the condensate as an additional working fluid to enhance the coefficient of performance (COP) of the system.

In an embodiment, heat is transferred into a field of microdroplets and/or nanodroplets in a working vapor compression system, which serves to decouples the cooling of the air from the work supplied from the compressor. Surprisingly, using typical HVAC testing systems, an apparent violation of the conservation of energy between the refrigerant side of the heat exchanger and the enthalpy change of the working fluid stream was observed when using traditional HVAC measuring systems and devices. The energy and mass balance discrepancy between these two parameters can be closed by accounting for the heat in the air transferred into the high surface area condensate. Importantly, rapid removal of this condensate provides for a more efficient (higher coefficient of performance (COP)) system design.

The heat transfer device (heat exchanger) transfers energy from the primary airflow to or from a working fluid constrained within the heat transfer device. In the event that energy transferred from the working fluid to the primary airflow, the heat transfer device is operating as a condenser, i.e. energy is removed from the working fluid, lowering its enthalpy, which can lead to condensation of the working fluid. In the event that energy is transferred to the working fluid from the primary airflow, the heat transfer device is operating as an evaporator, i.e., energy is transferred to the working fluid, raising its enthalpy, which can lead to evaporation of the working fluid. In this latter configuration, upon energy being removed from the primary airflow, this reduces its enthalpy, and can lead to the condensation of (primarily) water vapor contained in the primary airflow. The condensate can be collected and removed from the heat transfer device, resulting in a reduction in enthalpy of the primary airflow which leads to a useful cooling.

A collection device wherein condensate is effectively collected and routed to a specific location and which has design features to minimize pressure drop across the device may be included in a heat transfer system described herein. One such nonlimiting example of such a design feature would be a folded geometry with an open structure (such as a mesh) for airflow. A system such as this could be used to collect condensate for the supply of fresh water, or for the collection of environmental samples for analysis.

In one aspect, a heat transfer system is provided, which includes a heat transfer surface and a process fluid that comprises a vapor, wherein liquid droplets condense from the vapor on the heat transfer surface and are rapidly ejected from the heat transfer surface, thereby transferring heat from the process fluid to the liquid droplets. In some embodiments, the transfer of heat from the process fluid to the liquid droplets cools the process fluid and/or reduces the relative humidity of the process fluid. In some embodiments, the heat transfer system according to claim 1, wherein the heat transfer system has a sensible heat ratio less than unity. The liquid droplets may have an arithmetic mean diameter less than about 100 microns. The process fluid may be air with relative humidity greater than about 5%, wherein the liquid droplets are water. In some embodiments, the system is a vapor compression system. For example, the vapor compression system may be an air conditioner, a heat pump, a refrigerator, or a freezer. In some embodiments, the system further includes a collector device to coalesce and collect the liquid droplets, thereby separating the liquid droplets from the process fluid.

In another aspect, a heat transfer surface is provided. When the heat transfer surface is in contact with a process fluid that includes a vapor, liquid droplets condense from the vapor on and are rapidly ejected from the heat transfer surface, thereby transferring heat from the process fluid to the liquid droplets. In some embodiments, the droplets leave the surface without the addition of exogenous systems and/or forces in addition to flow of the process fluid.

In one embodiment, a fin, e.g., a fin of a heat exchanger, is provided, which includes a heat transfer surface as described herein. In one embodiment, a heat exchanger is provided that includes one or more fin(s) that include a heat transfer surface as described herein. For example, the heat exchanger may be configured as an evaporator or a condenser.

In another aspect, a heat exchanger is provided. The heat exchanger includes a heat transfer surface in contact with a process fluid that comprises a vapor. First droplets condense from the vapor on and are rapidly ejected from the heat transfer surface. The first droplets coalesce into second droplets that are larger than the first droplets, and the second droplets are collected and removed from the heat exchanger.

In some embodiments, the heat exchanger is cylindrical and includes a cylinder center line, wherein the process fluid flows inward toward the cylinder center line. In some embodiments, the first droplets are coalesced by inertial forces within a vortex. In some embodiments, the heat exchanger incudes an array of fins that defines an outer perimeter cylindrical wall, wherein the process fluid flows through the wall toward the cylinder center line. In one embodiment, the fins are straight and oriented orthogonal to the wall. In another embodiment, the fins are curved to promote a vortex in the cylindrical interior. In some embodiments, the first and/or second droplets are coalesced by inertial impaction with a mesh.

DETAILED DESCRIPTION

Figure 1:
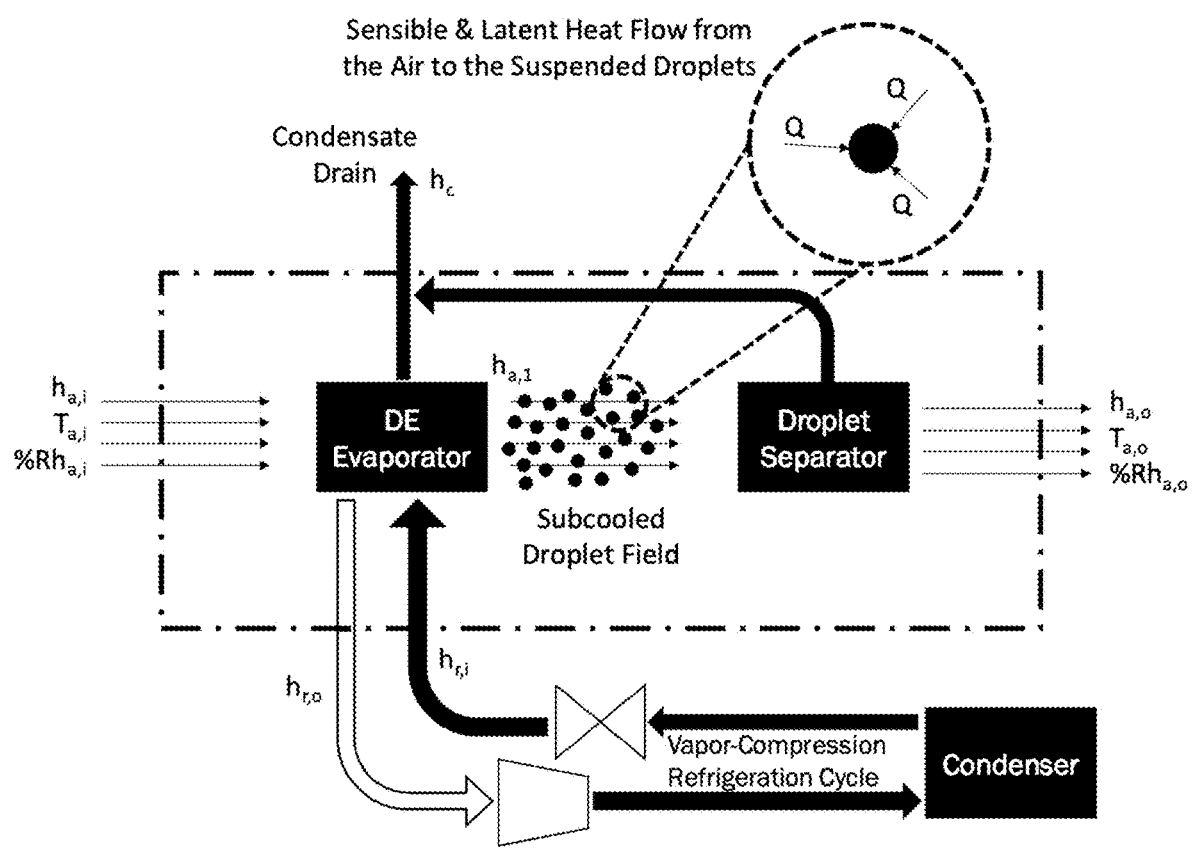
FIG. 1 depicts an embodiment of a vapor compression cycle, utilizing droplet field heat transfer.

The invention described herein provides processes and systems in which a field of microdroplets and/or nanodroplets is utilized to more effectively transfer heat from a process fluid to a working fluid than traditional systems. A condensate in the form of an entrained field of microdroplets and/or nanodroplets (i.e., entrained with the process fluid) serves as a heat sink, increasing the heat transfer surface area of the system, and may further cool a process fluid without additional input of energy into the system. In contrast, a traditional system in which condensate remains in close proximity to the working fluid has less effective thermal exchange with the process fluid, effectively resulting in cold condensate rather than cold air. The condensate is produced by inclusion of a heat transfer surface within the system, which rapidly ejects microdroplets and/or nanodroplets of fluid that condense on the surface as a process fluid passes over the surface. Heat exchanger systems that include a droplet collector or coalescer, to separate the entrained microdroplets and/or nanodroplets from the process fluid, are also described herein.

The heat transfer between the process and working fluid may be carried out by convection and radiation between the heat exchanger device and the process fluid. For example, the heat exchanger device surface temperatures may be colder than the process fluid. The surface temperature of the heat exchanger device results from conduction and convection from the working fluid (e.g., refrigerant or coolant). The heat transfer device may include fins and other structures (e.g., tubes) to promote the heat transfer between the process and working fluids.

By transferring heat into a high surface area droplet array, the cooling of a process fluid, such as air, can be partially decoupled from the electricity source, greatly increasing the COP of the system. An entrained field of subcooled droplets can pull large amounts of heat and moisture from a process fluid, such as humid air, for example, on a timescale of milliseconds. These droplets can then be rapidly removed from the process fluid before they reach a new equilibrium.

Definitions

"A," "an" and "the" include plural references unless the context clearly dictates otherwise.

Numeric ranges provided herein are inclusive of the numbers defining the range.

"Process fluid" refers to a liquid, gas or vapor that transmits energy to or from a working fluid. In the case of a vapor compression system, the process fluid is typically humid air.

"Working fluid" refers to a liquid or gas that absorbs or transmits energy from or to a process fluid. In the case of a vapor compression system, the working fluid is the refrigerant. In other systems, chilled water or glycol may be used as the working fluid.

"Refrigerant" refers to a working fluid in a vapor compression cycle that transfers heat to and from the air. Typical examples are chlorofluorocarbons, hydrochlorofluorocarbons, hydrofluorocarbons, propane, butane, isobutane, and ammonia.

"Sensible heat ratio" refers to the ratio of sensible cooling capacity to total cooling capacity. The total cooling capacity is often a sum of the sensible cooling capacity and latent cooling capacity of condensed water.

"Sensible cooling capacity" refers to the amount of heat which can be transferred to a material in the absence of phase change.

"Droplet field" refers to a suspended array of microdroplets and/or nanodroplets in a fluid with a very high surface area. These droplets are often entrained in airflow and may have arithmetic mean diameters less than about 100 microns.

"Microdroplets" refer to discrete small droplets of liquid which are primarily generated from the droplet ejection mechanism and with diameters less than about 5 mm such that they maintain largely suspended in a process fluid stream at velocities typically deployed devices and systems described herein. In certain nonlimiting embodiments, microdroplets are less than about 1 mm, e.g., for a typical HVAC system, and up to about 5 mm, e.g., for a higher velocity HVAC or refrigeration system.

"Nanodroplets" refer to discrete small droplets of liquid which are primarily generated from the droplet ejection mechanism and with diameters less than 0.5 mm such that they maintain largely suspended in a process fluid stream at velocities typically deployed devices and systems described herein.

"Relative humidity" refers to the amount of water vapor present in air expressed as a percentage of the amount needed for saturation at the same temperature.

"Coefficient of performance" or "COP" refers to the amount of cooling power achieved divided by the power input of the heat transfer system.

Figure 6:
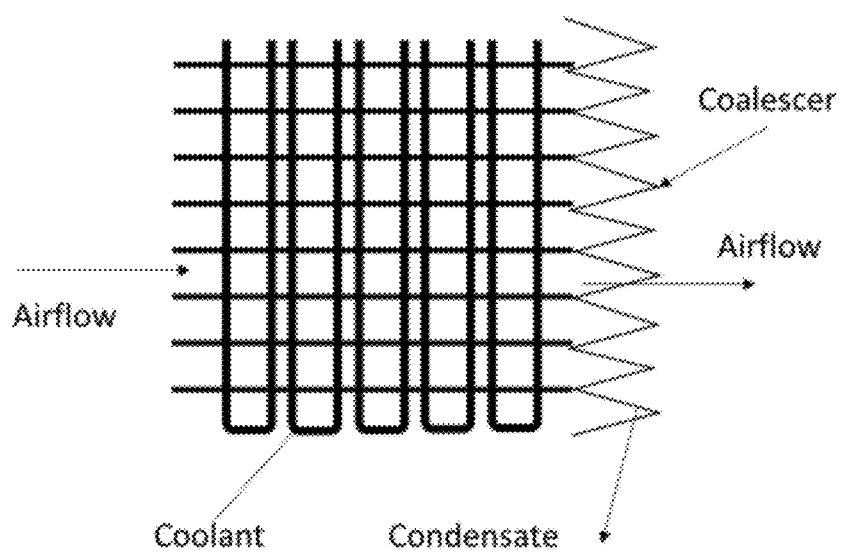
FIG. 6 depicts a non-limiting top view/cross section of a heat exchanger-collector, e.g., coalescer.

A "fin" refers to an elongated surface of a heat exchanger. Adding a fin to a heat exchanger increases the surface area through which heat transfer may occur to or from the environment, e.g., by increasing convection. A nonlimiting example of fins is shown in FIG. 6; the horizontal materials that run parallel to the airflow are considered fins.

Droplet Field Heat Transfer

A heat transfer surface, e.g., a droplet ejecting coating, when in contact with a process fluid, e.g., humid air, causes microdroplets and/or nanodroplets, e.g., water, to form and rapidly leave the surface. These droplets will leave the surface and become entrained in the downstream fluid flow (e.g., airflow) of a system in which the heat transfer surface is a component.

In one embodiment, the system is an air conditioning system. Surprisingly, when the heat transfer into the refrigerant was measured in such a system that included a heat transfer surface as described herein, using well established test means and devices (e.g., American Refrigeration Institute test standard ARI 201/240) and compared with the amount of energy pulled out of the air, there was a large discrepancy. Although not wishing to be bound by theory, it is believed that the field of microdroplets and/or nanodroplets that is condensed out of the air, ejected from the heat exchanger surfaces, and then entrained in the air is subcooled due to the contact with the working fluid (refrigerant) heat sink and has a higher thermal conductivity than the air. Because this suspended droplet field is subcooled relative to the air, the high surface area droplet field can continue cooling the air as a second heat sink. This field of microdroplets and/or nanodroplets effectively increases the heat transfer surface area of the system and continues to cool the air without using additional electrical energy. In this case, the field of microdroplets and/or nanodroplets continues to cool and dehumidify the air. In this way, the system can be termed a dual sink cooling system (i.e., direct heat removal from the surface and heat removal from the droplet field).

In some embodiments, for effective system efficiency, the droplets are then immediately or rapidly separated from the process fluid (e.g., air) stream such that they cannot reequilibrate and re-saturate the process fluid with moisture (vapor). A droplet collector or coalescer may be included to separate the entrained microdroplets and/or nanodroplets from the process fluid (e.g., air).

The maximum capacity and efficiency gains of a dual sink cooling system provided by droplet field heat transfer can be obtained by rapidly collecting the droplets before they are allowed to revaporize in the process stream. Cooling systems are very cost sensitive, and thus having to add an additional component to the system could cause challenges entering markets. Consequently, by redesigning the geometry of the evaporator to encourage droplet coalescence, the field of microdroplets and/or nanodroplets can cool and dehumidify the air and can then be rapidly removed before resaturating the air and without any additional system components.

Heat Transfer Surface

Heat transfer surfaces are provided that promote ejection of liquid droplets when in contact with a process fluid (e.g., humid air) as described herein. Liquid droplets condense from the process fluid and are rapidly ejected from the surface. As liquid droplets leave the heat transfer surface, heat is transferred from the process fluid to the liquid droplets, and thereby the heat transfer surface serves to cool the process fluid. In some embodiments, droplets leave the heat transfer surface without addition of exogenous systems and/or forces, e.g., without addition of exogenous systems and/or forces in addition to movement of process fluid, such as air flow.

Heat transfer surfaces disclosed herein cause localized droplet stresses under condensation, and as the condensate droplets grow on the heat transfer surface, the surface tension overwhelms the adhesion forces, causing the droplets to leap from the surface like a spring.

In some embodiments, the heat transfer surface provides a sensible heat ratio less than unity.

In some embodiments, the liquid droplets that are ejected from the heat transfer surface have an arithmetic mean diameter of less than about 100 microns. In some embodiments, the liquid droplets have an arithmetic mean diameter of about 5 microns to about 300 microns, about 5 microns to about 50 microns, about 15 microns to about 100 microns, about 50 microns to about 150 microns, or about 100 microns to about 300 microns, or less than any of about 5, 10, 15, 20, 25, 50, 75, 100, 150, 200, or 300 microns.

In some embodiments, the process fluid in contact with the heat transfer surface is humid air, e.g., relative humidity greater than about 5%, and the liquid droplets that leave the surface are water. In some embodiments, the relative humidity is about 5% to about 100%, about 25% to about 100%, about 50% to about 100%, or about 75% to about 100%, or greater than any of about 5%, 10%, 15%, 20%, 25%, 30%, 35%, 40%, 45%, 50%, 55%, 60%, 65%, 70%, 75%, 80%, 90%, or 95%.

In some embodiments, the heat transfer surface is a surface of a heat exchanger, for example. For example, the heat transfer surface may be on one or more fin(s) of a heat exchanger. In one embodiment, a fin is provided that includes a heat transfer surface as disclosed herein coating all or a portion of the fin.

Nonlimiting examples of droplet ejecting coating materials that may be deployed in conjunction with the processes and systems described herein are provided in PCT/US2017/52119, which is incorporated by reference herein.

Systems

Systems are provided that include one or more heat transfer surface as described herein. The systems disclosed herein include a process fluid, e.g., a process fluid stream that is in contact with the heat transfer surface(s). During operation of the system, vapor (e.g., water vapor) in the process fluid (e.g., humid air) condenses on the heat transfer surface and is rapidly ejected as liquid (e.g., liquid water) droplets, thereby transferring heat from the process fluid to the droplets. The droplets leave the heat transfer surface and become entrained in the downstream process fluid flow in the system. In some embodiments, the condensation of liquid in the process fluid and ejection of droplets from the heat transfer surface serves to cool the process fluid, in comparison with an identical system that does not include the heat transfer surface. In some embodiments, the process fluid is up to about 5° C. or up to about 10° C. cooler, or any of about 0.1° C. to about 0.2° C., about 0.2° C. to about 0.5° C., about 0.5° C. to about 1° C., about 1° C. to about 2° C., about 2° C. to about 3° C., about 3° C. to about 5° C., about 0.1° C. to about 0.5° C., about 0.2° C. to about 1° C., about 0.5° C. to about 5° C., about 0.1° C. to about 5° C., or about 5° C. to about 10° C. cooler in comparison with an identical system that does not include the heat transfer surface.

In some embodiments, the system operates at a sensible heat ratio less than unity.

In some embodiments, the liquid droplets that are ejected from the heat transfer surface and are entrained in the downstream process fluid flow have an arithmetic mean diameter of less than about 100 microns. In some embodiments, the liquid droplets have an arithmetic mean diameter of about 5 microns to about 300 microns, about 5 microns to about 50 microns, about 15 microns to about 100 microns, about 50 microns to about 150 microns, or about 100 microns to about 300 microns, or less than any of about 5, 10, 15, 20, 25, 50, 75, 100, 150, 200, or 300 microns.

In some embodiments, the process fluid that in contact with the heat transfer surface is humid air, e.g., relative humidity greater than about 5%, and the liquid droplets that are ejected from the heat transfer surface are water.

In some embodiments, the system comprises or consists of a vapor compression system. For example, the vapor compression system may be an air conditioning system a heat pump, a refrigerator, or a freezer.

In some embodiments, the system comprises or consists of a chilled liquid system. For example, the system may be a chilled water or glycol loop providing the thermal driving force.

In some embodiments, the system comprises or consists of a Peltier or other electrically cooled system. For example, the system may be a solar to electrical cooling system providing the thermal driving force.

In certain embodiments, the system may include a collector device to coalesce and collect the liquid droplets, thereby separating entrained liquid droplets from the process fluid. The collected liquid droplets (condensate) may be discarded or used for supplementing grey water, irrigation, environmental sampling, drinking, or other useful purposes.

In one embodiment, a vapor compression heat pump system is provided that utilizes two heat sinks for more efficient cooling operation: (1) heat flow into refrigerant via a high-density heat exchanger; and (2) heat flow into a dispersed array of microdroplets and/or nanodroplets that is subcooled, ejected, and entrained from evaporator heat transfer surfaces. Large surface area evaporator heat exchangers allow for millions of microdroplets and/or nanodroplets to become entrained into the air stream while simultaneously increasing the air side heat transfer rate. The large surface area of the subcooled water droplet array continues to pull more het and moisture out of the humid air until the driving force is significantly diminished. The droplets may then be rapidly removed from the air stream before they are permitted to revaporize and equilibrate with the air.

Coalescer

In some embodiments, a system as described herein includes a coalescer (a collector device to coalesce and collect the liquid droplets a collector device to coalesce and collect the liquid droplets). In an exemplary embodiment, a primary incident airflow enters the heat transfer device (heat exchanger). The primary airflow may be generated by forced or natural convection. The primary airflow may be forced, e.g., via forced convection, into the heat transfer device by a primary air movement device such as a fan or blower. Conversely, the primary airflow may be drawn into the heat transfer device due to a reduction of pressure on the downstream end of the heat transfer device. The reduction of pressure may be caused by a primary air movement device or by a natural convection flow generated by pressure differences arising from temperature differences or by a naturally occurring air flow with a predominant direction across the heat transfer device. The pressure drop of the primary incident airflow, across the heat transfer device is designed to be minimal, and may contain designs to promote effective heat transfer with a minimum of pressure drop.

The heat transfer device transfers energy from the primary airflow to or from a working fluid constrained within the heat transfer device. In the event that energy is transferred from the working fluid to the primary airflow, the heat transfer device is operating as a condenser, i.e., energy is removed from the working fluid, lowering its enthalpy, which can lead to condensation of the working fluid. In the event that energy transferred to the working fluid from the primary airflow, the heat transfer device is operating as an evaporator, i.e., energy is transferred to the working fluid, raising its enthalpy, which can lead to evaporation of the working fluid. In this latter configuration, upon energy being removed from the primary airflow, this reduces its enthalpy, and can lead to the condensation of (primarily) water vapor contained in the primary airflow. The condensate can be collected and removed from the heat transfer device, resulting in a reduction in enthalpy of the primary airflow which leads to a useful cooling.

In some devices, condensate which is formed from the primary airflow is not effectively collected and is revaporized in the primary airflow downstream of the heat transfer device which reduces the amount of useful cooling. In some further configurations, the heat transfer device may have modified surfaces which promotes initial condensation, but which is difficult to collect and remove. A device which promotes the collection of condensate is desired to improve the useful cooling. It is desirable that the collection device has a high condensate collection efficiency and a low pressure drop in the airflow direction, is easily fabricable, and of relatively low cost.

One configuration of a collection device that would achieve these objectives is a surface treated knitted mesh or surface treated formed mesh (FIG. 5). The surface treatment should be of low contact angle hysteresis and have a relatively open structure for the passage of the primary airflow. The formed mesh can be formed with a rigid structure which further promotes condensate collection efficiency, while at the same time having a low pressure drop. Another configuration would be a folded, wedge like structure in which the folds are aligned with a gravitational vector and the wedges protrude in the streamwise direction (FIG. 6). The device would be located on the downstream end of the heat transfer device.

A device of this type would also reduce the degree of blowoff (or uncollected condensate) which has a tendency to be transferred in the airflow streamwise direction and can be observed as an undesirable mist or fog.

Heat Exchangers

Heat exchangers are provided that include one or more heat transfer surface as described herein. A heat exchanger may be a component of a system as described herein, for example, a component in a vapor compression system. In the heat exchanger, vapor (e.g., water vapor) in a process fluid (e.g., humid air) condenses on the heat transfer surface and is rapidly ejected as liquid (e.g., liquid water) droplets, thereby transferring heat from the process fluid to the droplets. The droplets leave the heat transfer surface and become entrained in the downstream process fluid flow.

In some embodiments, first droplets leave the heat transfer surface and coalesce into larger second droplets, which are drained from the heat exchanger, e.g., gravitationally drained in accordance with the heat exchanger geometry. For example, first droplets which leave the heat transfer surface have an arithmetic mean diameter that is less than about 100 micrometers and coalesce into second, larger droplets for drainage. In one embodiment, the first droplets coalesce due to inertial forces. For example, droplets may collide with one another and coalesce upon contact. In some embodiments, the device may be configured such that flow of process fluid (e.g., airflow) is designed to 'focus' droplets, such that droplets are 'swirled' together, e.g., in the center of the device, increasing the rate of collision and coalescence. In an embodiment, the first droplets coalesce within a vortex. In another embodiment, droplet coalesce by inertial impaction with a planar component, such as a mesh.

The heat exchanger may be cylindrical or substantially cylindrical, and configured for process fluid flow toward the center line of the cylinder. In one embodiment, the heat exchanger is configured such that a vortex is created within the cylinder to accelerate coalescence of the first droplets. For example, the wall of the cylinder may include an array of fins. In one embodiment, the fins are curved to promote creation of a vortex in the interior of the cylinder. In another embodiment, the fins are straight and are oriented orthogonally to the wall of the cylinder.

In some embodiments, a heat exchanger as described herein is an evaporator or a condenser.

Methods

Methods are provided for removal of a vapor component from a gas stream and/or for cooling a gas stream. The methods include contacting a heat transfer surface with a gas stream, for example, humid air. The heat transfer surface promotes ejection of liquid droplets when in contact with the gas stream. Liquid droplets condense from the gas stream and are rapidly ejected from the surface. As liquid droplets leave the heat transfer surface, heat is transferred from the gas stream to the liquid droplets. In some embodiments, the transfer of heat from the gas stream to the liquid droplets cools the gas stream.

In some embodiments, the liquid droplets that are ejected from the heat transfer surface have an arithmetic mean diameter of less than about 100 microns. In some embodiments, the liquid droplets have an arithmetic mean diameter of about 5 microns to about 300 microns, about 5 microns to about 50 microns, about 15 microns to about 100 microns, about 50 microns to about 150 microns, or about 100 microns to about 300 microns, or less than any of about 5, 10, 15, 20, 25, 50, 75, 100, 150, 200, or 300 microns.

In some embodiments, the gas stream that in contact with the heat transfer surface is humid air, e.g., relative humidity greater than about 5%, and the liquid droplets that are ejected from the heat transfer surface are water. In some embodiments, the relative humidity is about 5% to about 100%, about 25% to about 100%, about 50% to about 100%, or about 75% to about 100%, or greater than any of about 5%, 10%, 15%, 20%, 25%, 30%, 35%, 40%, 45%, 50%, 55%, 60%, 65%, 70%, 75%, 80%, 90%, or 95%.

In some embodiments, the method may include promoting coalescence and collection of the liquid droplets, thereby separating entrained liquid droplets from the gas stream.

In some embodiments, the gas stream is a process fluid, such as air, for example, humid air from a vapor compression system.

EXEMPLARY EMBODIMENTS

Figure 2:
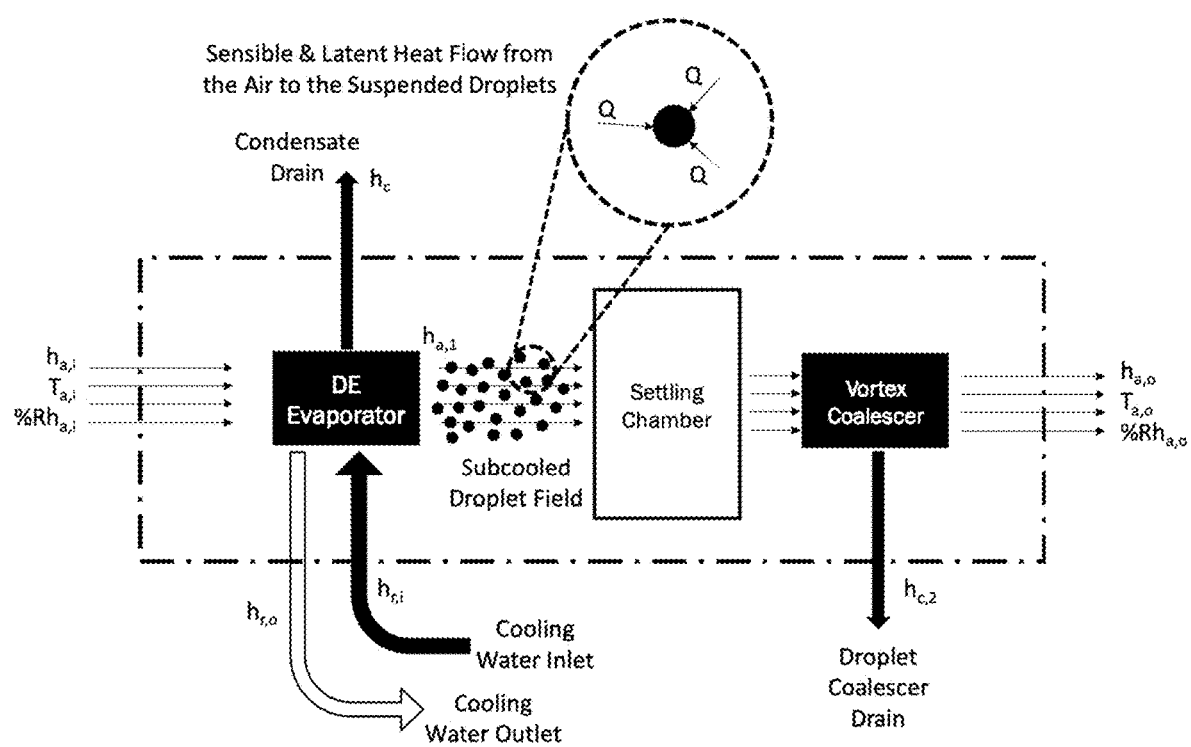
FIG. 2 depicts an embodiment of a water-cooled evaporator, utilizing droplet field heat transfer.
Figure 3:
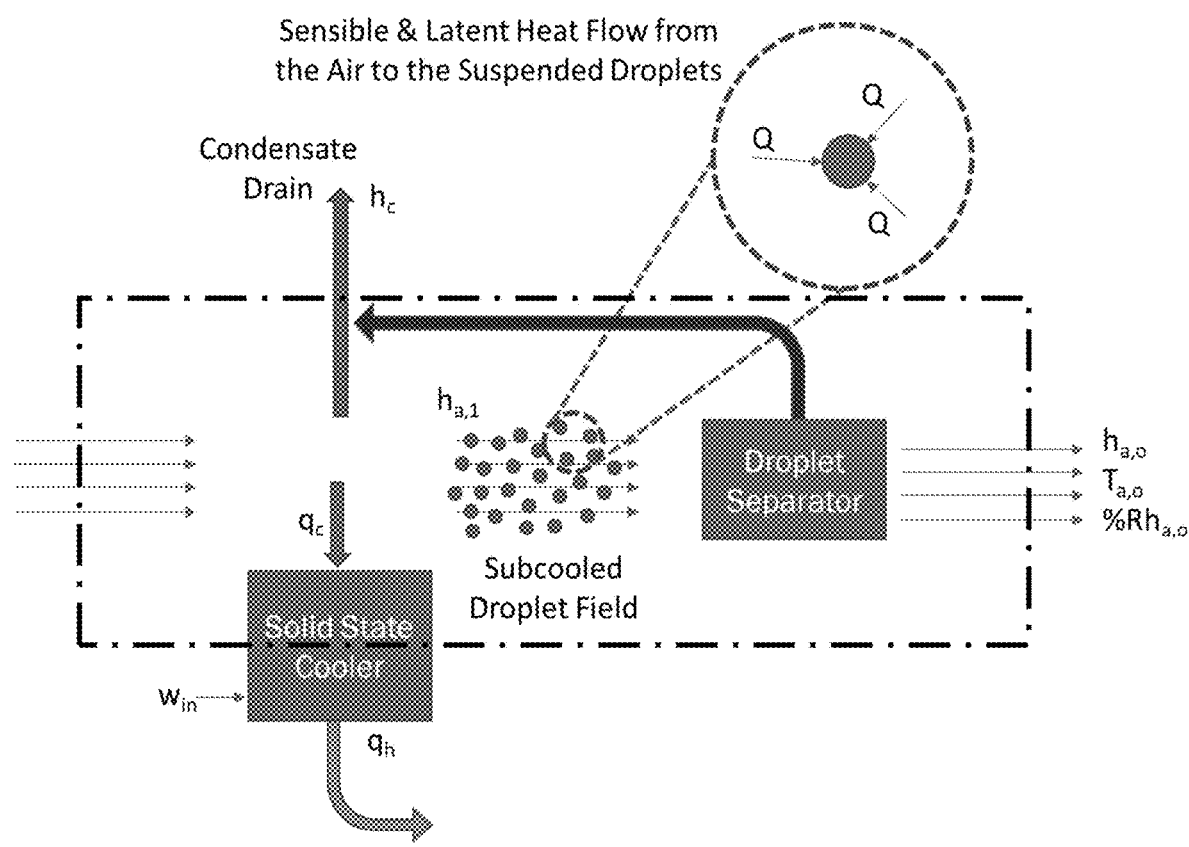
FIG. 3 depicts an embodiment of a solid-state cooling system, utilizing droplet field heat transfer.

FIGS. 1, 2, and 3 show ways of coalescing droplets without significantly altering the system design by adding a coalescer downstream of an evaporator or solid-state cooler. In an embodiment, a hydrophilic surface (e.g., a hydrophilic coating material) may be added to enhance the effectiveness of the coalescer.

FIG. 1 depicts an exemplary embodiment of a vapor compression cycle in an air conditioner or heat pump utilizing droplet field heat transfer with a droplet ejecting evaporator and optional droplet separator (coalescer). The system is designed to leverage the flow of the working fluid and kinetics of the process with a droplet ejecting surface, to remove the generated droplets in an efficient manner. This is an example system that looks and functions like a typical vapor compression cycle. The only addition is a surface modification of the evaporator surface (e.g., fins) to render it capable of droplet ejecting heat transfer and a downstream droplet separator. In this case, the evaporator cools the dehumidifies the air while simultaneously ejecting sub-cooled nano- and micro-droplets into the air. The entrained field of subcooled droplets acts as a heat sink to further cool and dehumidify the saturated air that typically exits an evaporator. The droplet field is then separated from the further cooled air stream by a droplet separator and collected as condensate while the air passes through.

FIG. 2 depicts an exemplary embodiment of a water-cooled evaporator, with a settling chamber upstream of the droplet separator. A settling chamber may be included to increase the residency time of the droplet field, resulting in a flow that is closer to an equilibrium condition. In another example, the system may be operated in evaporative cooler mode, with droplet collection efficiency used to control outlet humidity.

In certain embodiments, once the high surface area, entrained droplet field has removed more energy from the air, it should be rapidly removed before it can re-equilibrate with the air and increase the air humidity further. In such embodiments, the coalescer should be put as close to the evaporator as possible to maximize the effectiveness.

A nonlimiting example of a solid-state system design is depicted in FIG. 3. For example, heat removal (working fluid) may be a solid-state cooler, e.g., a Peltier cooler where electricity is converted directly to thermal energy.

Figure 4:
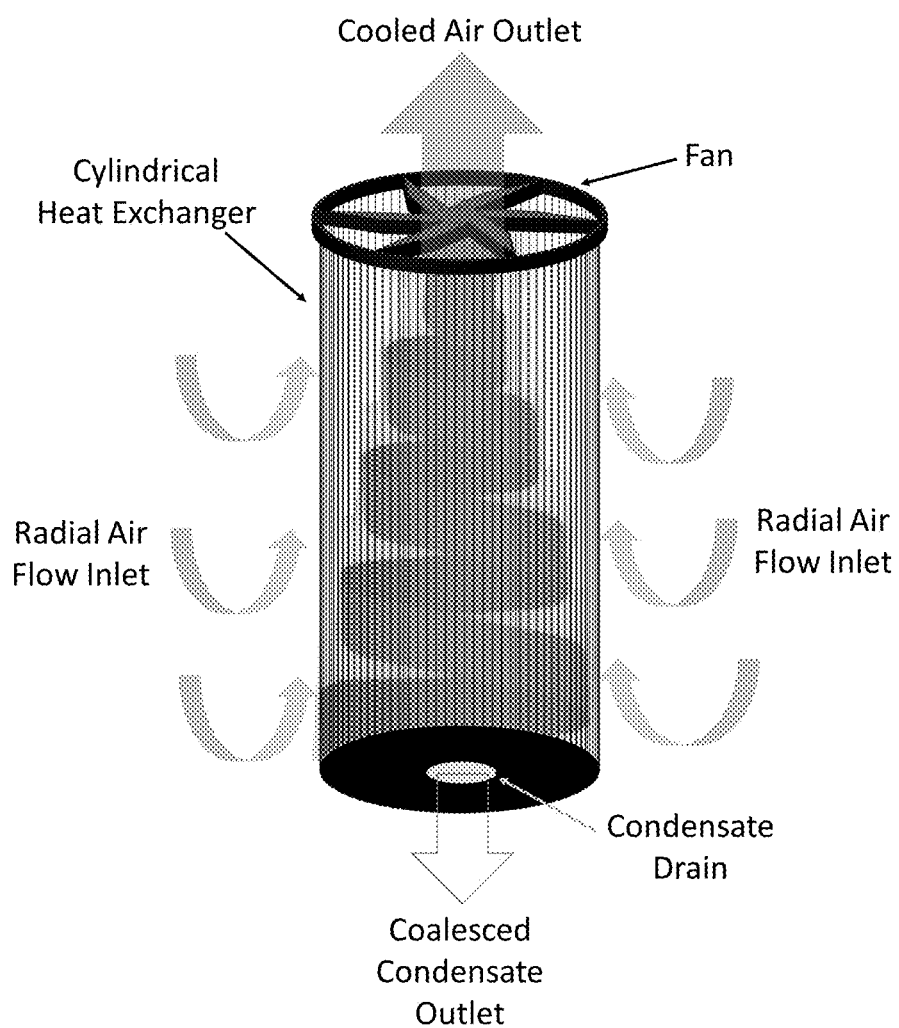
FIG. 4 depicts a bent fin-tube evaporator that forces air into the fin array radially toward the center line.
Figure 5:
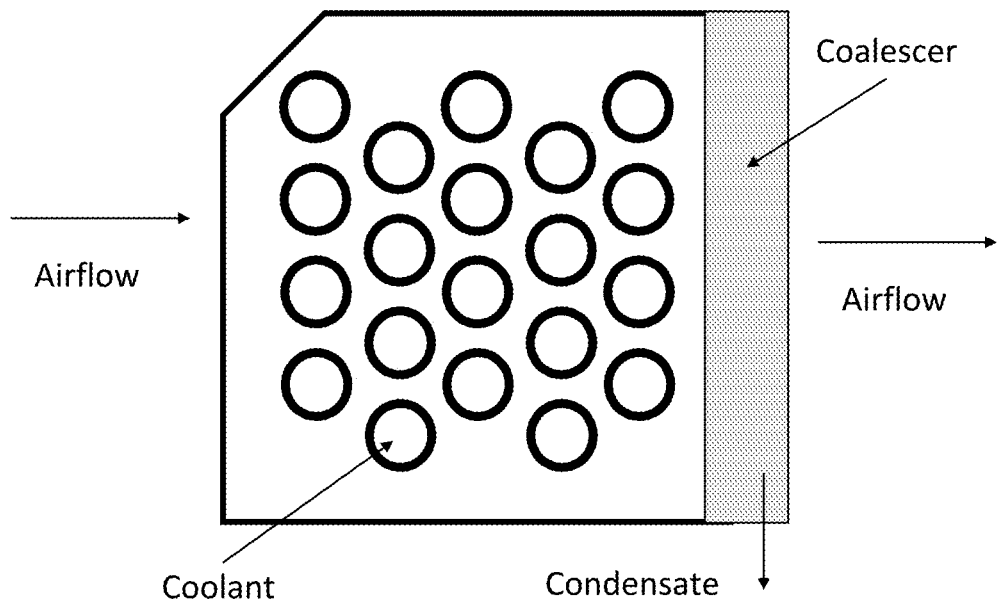
FIG. 5 depicts a non-limiting cross section of a heat exchanger-collector, e.g., coalescer.

A nonlimiting functional design of a heat exchanger is depicted in FIG. 4. In this case, a large heat exchanger is bent around a radius of about its length over $2\pi$. This design can be further modified by orienting the fins from orthogonal to the heat exchanger surface to manipulate the air flow to form a vortex in the center of the heat exchanger. This air flow pattern will pull the field of microdroplets and/or nanodroplets into the center of the cylinder and encourage coalescence and droplet draining through the bottom of the heat exchanger while the air is pulled through a fan at the top of the heat exchanger.

In the bent fin-tube evaporator design shown in FIG. 4, air is forced into the fin array radially toward the center line. The fins cool and dehumidify the air as it passes through the cylindrical fin array moving toward the center line. The natural flow of the air forms a mild vortex and encourages mixing of air and droplet coalescence on a short time frame. The air flows upward against gravity, while the condensate and coalesced droplets fall downward to drain. This radial evaporator allows for a smaller footprint and simultaneously acts as a droplet coalescer due to the natural flow of the air. When coated with a droplet ejecting coating, this heat exchanger design can decouple the air cooling from the heat transferred into the refrigerant.

Figure 7:
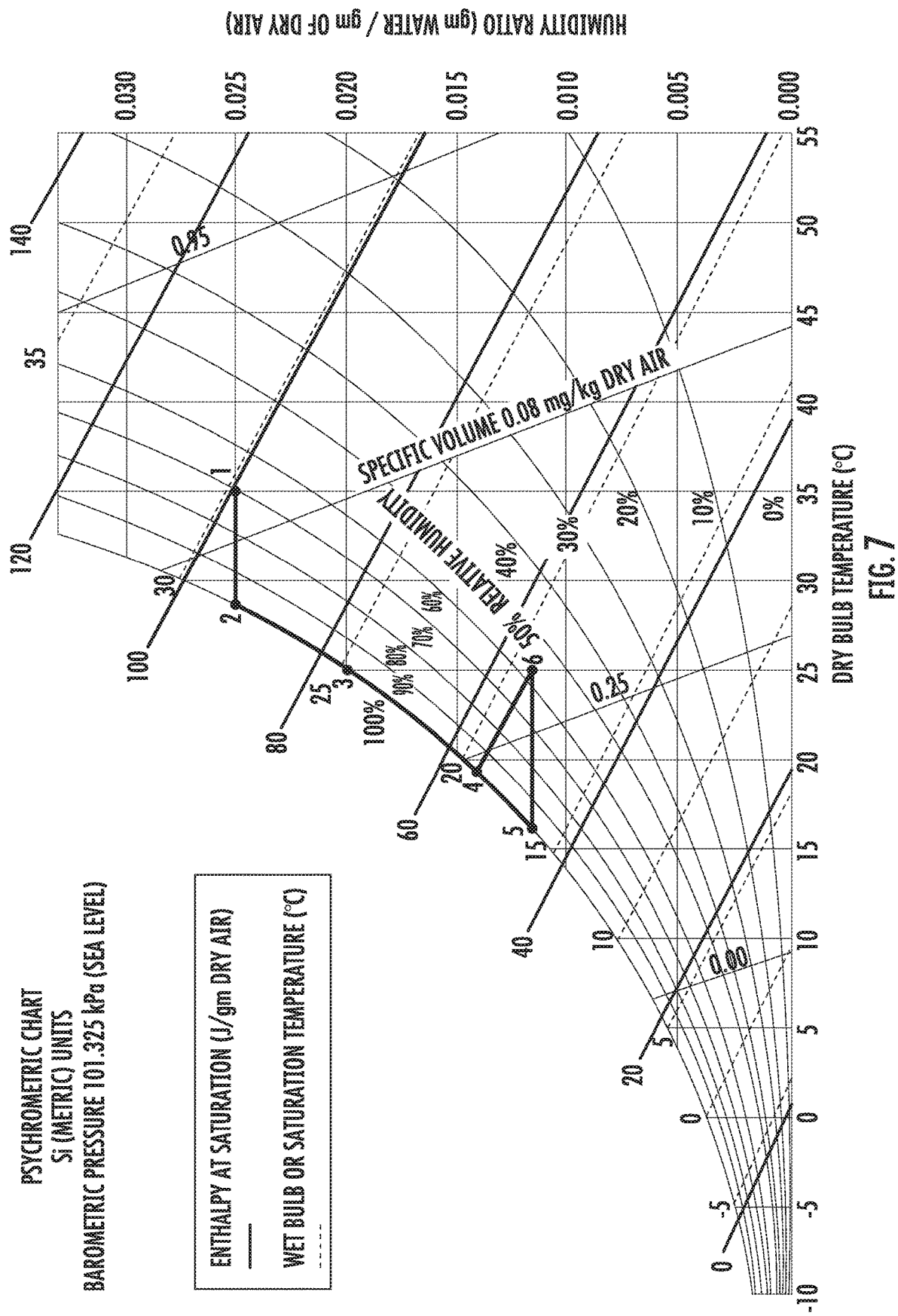
FIG. 7 is a psychrometric chart path diagram based on keeping the air at the same temperature, but reducing its humidity to prevent subcooling and reheating.

FIG. 7 shows a psychrometric chart with two cooling paths from 35° C., 70% RH to 25° C., 60% RH. Path 1→2→3→4→5→6 is a typical cooling path while 1→2→3→4→6 is an example path that is enabled by the disclosed heat transfer system.

In certain embodiments, condensate collection devices may be augmented with hydrophilic or hydrophobic surface treatments, electric fields, or other means to enhance the collection efficiency.

The following examples are intended to illustrate, but not limit, the invention.

EXAMPLES

Example 1

A fin and tube heat exchanger, with surface modified fins that contained a surface material that promotes droplets jumping off of a surface (droplet ejection), was placed in a controlled cooling environment, depicted schematically in FIG. 2.

This system used a recirculating chiller on the tube side filled with a glycol-water mixture. This water side loop was measured for inlet temperature, outlet temperature, and coolant flow. These measurements allowed for the calculation of the heat transferred into the refrigerant.

The air flowing across the heat exchanger was also measured for inlet temperature, outlet temperature, inlet relative humidity, outlet relative humidity, and volumetric flow. These measurements were used to calculate the amount of energy removed from the air as it crossed the heat exchanger.

The air then entered a settling chamber, after which the air was forced through a vortex nozzle. The air temperature and relative humidity leaving the nozzle was then measured again.

The air measured immediately after leaving the heat exchanger under various air input temperatures and humidities was observed to leave the evaporator heat exchanger sub-saturated with humidities less than 80%, in comparison to an unmodified heat exchanger, from which air left at near saturation (>95% relative humidity (RH)). Once the air passed through the settling chamber and vortex nozzle, the air for both the modified and unmodified heat exchangers was observed to be near saturation (>95% RH). It was observed that a large amount of very small water droplets was carried a few meters downstream at typical heating, ventilation, and air conditioning (HVAC) air velocities on the modified unit. The heat transfer from the air was observed to be 30% greater than the heat transfer going into the refrigerant. The excess heat removed from the air was thus transferred into the condensate drain via the coalescence of microdroplets.

Example 2

A modified heat exchanger as described in Example 1 was mounted into a wind tunnel, and humid air was flowed across on one side while the tube side was cooled with flowing water. Microdroplets became entrained in the air and carried more than 3 meters downstream. This example illustrates that a droplet collection device is desirable for a heat exchanger with these modifications.

Example 3

A modified heat exchanger was mounted into a wind tunnel, and humid air was flowed across on one side while the other side was cooled with a Peltier cooling device. Microdroplets become entrained in the air and carried downstream. This example illustrates that a droplet collection device is desirable for a heat exchanger with these modifications.

Example 4

A modified aluminum brazed radiator that is 2 feet tall by 2 feet wide is bent at a radius of about 0.3 feet into a cylinder (FIG. 4). The bottom is capped sufficiently to inhibit airflow into the bottom. A small hole is cut into the bottom to allow for water drainage. The radiator is then hooked up to a closed loop chiller where water is flowed through the radiator at about 10° C. A centrifugal blower fan is then connected to the top of the radiator in a fashion where air is pulled out the top of the cylinder. The airflow is such that microdroplets leaving the radiator surface are pulled in radially and upward. This flow pattern causes many of the droplets to coalescence and fall downward through the drain. This radiator design encourages microdroplet coalescence.

Example 5

A heat exchanger is placed in a cooling environment. This system uses a vapor compression driven or other system for operation.

The condensate collected from the device is sampled and tested for analytical properties and compounds of interest. These data are compared to publicly available environmental conditions. These comparisons can be used to determine the type and amount of water-soluble environmental pollutants and irritants.

Example 6

A heat exchanger is placed into a vapor compression system. The path of energy flow using a psychrometric diagram for a typical system relative to the disclosed system is shown in FIG. 7. The proposed system is about 30% more efficient due to state-of-the-art air-conditioning technologies being inefficient as sub-cooling below the desired temperature setpoint is necessary to achieve the desired humidity, thus causing necessary air reheating to hit the desired temperature setpoint. The traditional path of current systems, $1\rightarrow2\rightarrow3\rightarrow4\rightarrow5\rightarrow6$ on the psychrometric chart, consumes about 65 kJ/kg-dry air, whereas the disclosed system utilizes path $1\rightarrow2\rightarrow3\rightarrow4\rightarrow6$ which consumes about 45 kJ/kg-dry air. This adiabatic dehumidification prevents subcooling and reheating of the air, consuming 30% less energy for the same output. Adiabatic dehumidification is enabled by the droplet ejection and collection mechanisms described herein.

Although the foregoing invention has been described in some detail by way of illustration and examples for purposes of clarity of understanding, it will be apparent to those skilled in the art that certain changes and modifications may be practiced without departing from the spirit and scope of the invention. Therefore, the description should not be construed as limiting the scope of the invention, which is delineated in the appended claims.

We claim:

1. A heat transfer system comprising a heat transfer surface and a process fluid that comprises a vapor, wherein a liquid condenses from the vapor on the heat transfer surface and droplets of the liquid that are subcooled relative to the process fluid are ejected from the heat transfer surface and entrained in the process fluid, thereby transferring heat between the process fluid and the subcooled liquid droplets, and wherein transferring heat between the process fluid and the subcooled liquid droplets dehumidifies the process fluid.

2. The heat transfer system according to claim 1, wherein the transfer of heat between the process fluid and the liquid droplets cools the process fluid.

3. The heat transfer system according to claim 1, wherein the heat transfer system has a sensible heat ratio less than unity.

4. The heat transfer system according to claim 1, wherein the liquid droplets comprise an arithmetic mean diameter less than 100 microns.

5. The heat transfer system according to claim 1, wherein the process fluid is air with relative humidity greater than 5% and the liquid droplets comprise water.

6. The heat transfer system according to claim 5, wherein the system is a vapor compression system.

7. The heat transfer system according to claim 6, wherein the vapor compression system is selected from an air conditioner, a heat pump, a refrigerator, and a freezer.

8. The heat transfer system according to claim 1, further comprising a collector device to coalesce and collect the liquid droplets, thereby separating the liquid droplets from the process fluid.

9. A heat transfer surface in contact with a process fluid that comprises a vapor, wherein a liquid condenses from the vapor on the heat transfer surface and droplets of the liquid that are subcooled relative to the process fluid are ejected from the heat transfer surface and entrained in the process fluid, thereby transferring heat between the process fluid and the subcooled liquid droplets, and wherein transferring heat between the process fluid and the subcooled liquid droplets dehumidifies the process fluid.

10. The heat transfer surface according to claim 9, wherein the liquid droplets leave the surface without additional input of energy.

11. A fin of a heat exchanger, comprising the heat transfer surface according to claim 9.

12. A heat exchanger, comprising the fin according to claim 11.

13. The heat exchanger according to claim 12, wherein the heat exchanger is an evaporator or a condenser.

14. A method for removal of a vapor component from a gas stream, comprising:
 contacting a heat transfer surface according to claim 9 with a gas stream that comprises a vapor,
 wherein a liquid condenses from said vapor on said heat transfer surface and droplets of the liquid that are subcooled relative to the gas stream are ejected from the surface, thereby entraining the liquid droplets in the gas stream,
 wherein when said subcooled liquid droplets are ejected from the surface, heat is transferred between the gas stream and the subcooled liquid droplets, and
 wherein transferring heat between the gas stream and the subcooled liquid droplets dehumidifies the gas stream.

15. The method according to claim 14, wherein said transfer of heat between the gas stream and the liquid droplets cools the gas stream.

16. The method according to claim 14, wherein the gas stream is humid air with a relative humidity greater than 5%, and wherein the liquid droplets that are ejected from the heat transfer surface comprise water.

17. The method according to claim 14, wherein the gas stream is a process fluid, and wherein transfer of heat between the process fluid and the liquid droplets cools the process fluid.

18. The method according to claim 14, wherein the liquid droplets that are ejected from the heat transfer surface comprise an arithmetic mean diameter less than 100 microns.

19. The method according to claim 14, further comprising coalescence and collection of the liquid droplets, thereby separating the entrained liquid droplets from the gas stream.

* * * * *